United States Patent
Tanaka

(10) Patent No.: US 12,139,560 B2
(45) Date of Patent: Nov. 12, 2024

(54) CELLULOSE RESIN, MOLDING MATERIAL, MOLDED BODY, AND METHOD FOR PRODUCING CELLULOSE RESIN

(71) Applicant: NEC CORPORATION, Tokyo (JP)

(72) Inventor: Shukichi Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 482 days.

(21) Appl. No.: 16/976,814

(22) PCT Filed: Feb. 14, 2019

(86) PCT No.: PCT/JP2019/005267
§ 371 (c)(1),
(2) Date: Aug. 31, 2020

(87) PCT Pub. No.: WO2019/167641
PCT Pub. Date: Sep. 6, 2019

(65) Prior Publication Data
US 2020/0399402 A1    Dec. 24, 2020

(30) Foreign Application Priority Data

Mar. 1, 2018  (JP) .................................. 2018-036423

(51) Int. Cl.
C08B 3/16    (2006.01)
(52) U.S. Cl.
CPC ...................................... C08B 3/16 (2013.01)
(58) Field of Classification Search
CPC ....................................................... C08B 3/16
See application file for complete search history.

(56) References Cited

U.S. PATENT DOCUMENTS

| | | | |
|---|---|---|---|
| 10,934,368 B2 * | 3/2021 | Tanaka | C08L 1/14 |
| 2018/0291117 A1 * | 10/2018 | Shimura | C08L 1/10 |
| 2019/0169402 A1 * | 6/2019 | Toyama | C08K 5/06 |

FOREIGN PATENT DOCUMENTS

| | | |
|---|---|---|
| JP | 2002-265639 A | 9/2002 |
| JP | 2010-121121 A | 6/2010 |
| JP | 2012-167155 A | 9/2012 |
| JP | 2017-203051 A | 11/2017 |
| WO | 2011/043279 A1 | 4/2011 |
| WO | 2011/043280 A1 | 4/2011 |
| WO | 2013/180278 A1 | 12/2013 |
| WO | 2015/060122 A1 | 4/2015 |
| WO | 2015/162787 A1 | 10/2015 |
| WO | 2016/067662 A1 | 5/2016 |
| WO | 2016/158934 A1 | 10/2016 |
| WO | 2017/115634 A1 | 7/2017 |
| WO | 2017/217502 A1 | 12/2017 |
| WO | 2017/217503 A1 | 12/2017 |
| WO | 2018/221663 A1 | 12/2018 |

OTHER PUBLICATIONS

Tanaka et al—WO 2017115634 A1, Machine Translated Copy—Claims (Year: 2017).*
Tanaka et al—WO 2017115634 A1, Machine Translated Copy—Description (Year: 2017).*
International Search Report for PCT/JP2019/005267 dated Mar. 19, 2019 (PCT/ISA/210).

* cited by examiner

*Primary Examiner* — Layla D Berry
(74) *Attorney, Agent, or Firm* — Sughrue Mion, PLLC

(57) ABSTRACT

A cellulose resin in which hydrogen atoms of hydroxy groups of cellulose are substituted with a long-chain component which is a linear aliphatic acyl group having 14 or more carbon atoms and a short-chain component which is at least one of an acyl group having 2 carbon atoms and an acyl group having 3 carbon atoms, wherein a nitrogen content in the cellulose resin is 300 ppm or more and 2000 ppm or less. To provide a cellulose resin excellent in mechanical properties and heat decomposition resistance.

6 Claims, 1 Drawing Sheet

CELLULOSE RESIN, MOLDING MATERIAL, MOLDED BODY, AND METHOD FOR PRODUCING CELLULOSE RESIN

CROSS REFERENCE TO RELATED APPLICATIONS

This application is a National Stage of International Application No. PCT/JP2019/005267 filed Feb. 14, 2019, claiming priority based on Japanese Patent Application No. 2018-036423 filed Mar. 1, 2018, the entire disclosure of which is incorporated herein.

TECHNICAL FIELD

The present invention relates to a cellulose resin, a molding material and a molded body, and a method for producing a cellulose resin.

BACKGROUND ART

Bioplastics made from vegetable law materials can contribute to countermeasures against petroleum depletion and global warming, and has been started being used in general products such as packaging, containers and fibers but also in durable products such as electronic equipment and automobiles.

However, conventional bioplastics, such as polylactic acid, polyhydroxyalkanates, modified starch, are all made of starch-based materials, i.e., edible parts. Therefore, in view of concerns about food shortages in the future, the development of new bioplastics using non-edible parts as raw materials is required.

As a raw material of the non-edible part, cellulose, which is a main component of wood and vegetation, is typical, and various bioplastics using the cellulose have been developed and commercialized.

However, the process of chemically modifying cellulose into a resin suitable for molding is complicated and laborious, and the production energy is also large, so that the production cost of the cellulose resin is high. Furthermore, the mechanical properties of the produced resins are also not sufficient.

Cellulose is produced as pulp by chemically separating lignin and hemicellulose from wood and the like with an agent. Alternatively, since cotton is substantially made of cellulose, it can be used as it is. Such cellulose, which is a polymer in which β-glucose is polymerized, has many hydroxy groups, and accordingly has a strong intermolecular force due to hydrogen bonding. Therefore, it is hard and brittle, and has no thermoplasticity, and also the solvent solubility is low except for a special solvent.

In order to modify such cellulose, various studies have been conducted.

As a method of modifying cellulose, a method is known in which a hydrogen atom of a hydroxy group of cellulose is substituted with a short-chain acyl group such as an acetyl group. According to this method, since the number of hydroxy groups can be reduced, the intermolecular force of cellulose can be reduced. Furthermore, it has been studied to produce a cellulose derivative having good thermoplasticity by introducing a long chain organic group having a larger number of carbon atoms in addition to a short chain acyl group such as an acetyl group.

For example, Patent Literature 1 describes a cellulose acylate film produced from a solution in which a cellulose acylate in which the degree of substitution of a hydroxy group of cellulose satisfies a specific condition and a polyvalent carboxylic acid having a carboxyl group having a carbon number of 22 or less and an acid dissociation index of 4.4 or less are dissolved in an organic solvent. An example using cellulose triacetate as a cellulose acylate is described. It is described that the production of such a film can be easily peeled from a support after casting and drying, and is excellent in productivity.

In addition, Patent Literature 2 describes a cellulose derivative in which at least a part of the hydrogen atoms of the hydroxy groups of cellulose is substituted with a short chain acyl group (e.g., an aliphatic acyl group having 2 to 4 carbon atoms) and a long chain acyl group (e.g., an aliphatic acyl group having 5 to 20 carbon atoms), and it is described that the cellulose derivative has good thermoplasticity, strength and elongation at break, and is suitable for molding processes.

Patent Literature 3 describes a method for producing a cellulose derivative in which a long chain organic group having 5 or more carbon atoms and a short chain organic group having 4 or less carbon atoms are introduced into cellulose by a reaction in a solid-liquid heterogeneous system, and solid-liquid separation is performed to obtain the cellulose derivative.

Patent Literature 4 describes a cellulose derivative into which cardanol is introduced, and it is described that the cellulose derivative has improved thermoplastic and mechanical properties.

Patent Literature 5 describes a cellulose derivative into which cardanol and abietic acid are introduced, and it is described that the cellulose derivative has improved thermoplastic and mechanical properties.

Patent Literature 6 describes a cellulose derivative in which a long-chain organic group having 5 or more carbon atoms and a short-chain organic group having 4 or less carbon atoms are introduced using hydroxy groups of cellulose, and having a crystal structure derived from a cellulose derivative portion to which the short-chain organic group is bonded, and an average number of hydroxy groups per glucose unit of 1.0 or less. It is also described that cellulose derivatives having modified properties can be provided.

Patent Literature 7 describes a cellulose derivative in which a linear saturated aliphatic acyl group having 14 or more carbon atoms and an acyl group having 2 or 3 carbon atoms are introduced using hydroxy groups of cellulose. It is also described that a cellulose derivative which is excellent in mechanical properties and durability and having a high plant component ratio can be provided.

CITATION LIST

Patent Literature

Patent Literature 1: JP 2002-265639 A
Patent Literature 2: JP 2010-121121 A
Patent Literature 3: WO 2013/180278 A1
Patent Literature 4: WO 2011/043279 A1
Patent Literature 5: WO 2011/043280 A1
Patent Literature 6: WO 2016/067662 A1
Patent Literature 7: WO 2017/115634 A1

SUMMARY OF INVENTION

Technical Problem

However, there is a need for further improvement in the properties of cellulosic resins according to the related art. An object of the present invention is to provide a cellulose resin excellent in mechanical properties and thermal decomposition resistance and a method for producing the same.

Solution to Problem

According to an aspect of the present invention, there is provided a cellulose resin in which hydrogen atoms of hydroxy groups of cellulose are substituted with a long-chain component which is a linear aliphatic acyl group having 14 or more carbon atoms and a short-chain component which is at least one of an acyl group having 2 carbon atoms and an acyl group having 3 carbon atoms, wherein a nitrogen content in the cellulose resin is 300 ppm or more and 2000 ppm or less.

According to another aspect of the present invention, there is provided a molding material comprising the above cellulose resin.

According to another aspect of the present invention, there is provided a molded body formed using the above molding material.

According to another aspect of the present invention, there is provided a method for producing the above cellulose resin, comprising:
  reacting a pulp dispersed in an organic solvent with a short chain acylating agent for introducing an acyl group having 2 to 3 carbon atoms and a long-chain acylating agent for introducing an acyl group having 14 or more carbon atoms, in the presence of a basic nitrogen-containing organic compound under heating at 100° C. or below, to acylate hydroxy groups of a cellulose constituting the pulp; and
  separating an acylated cellulose obtained by the acylation from the organic solvent Advantageous Effects of Invention According to an exemplary embodiment of the present invention, it is possible to provide a cellulose resin excellent in mechanical properties and thermal decomposition resistance and a method for producing the same.

DESCRIPTION OF EMBODIMENTS

Figure 1:
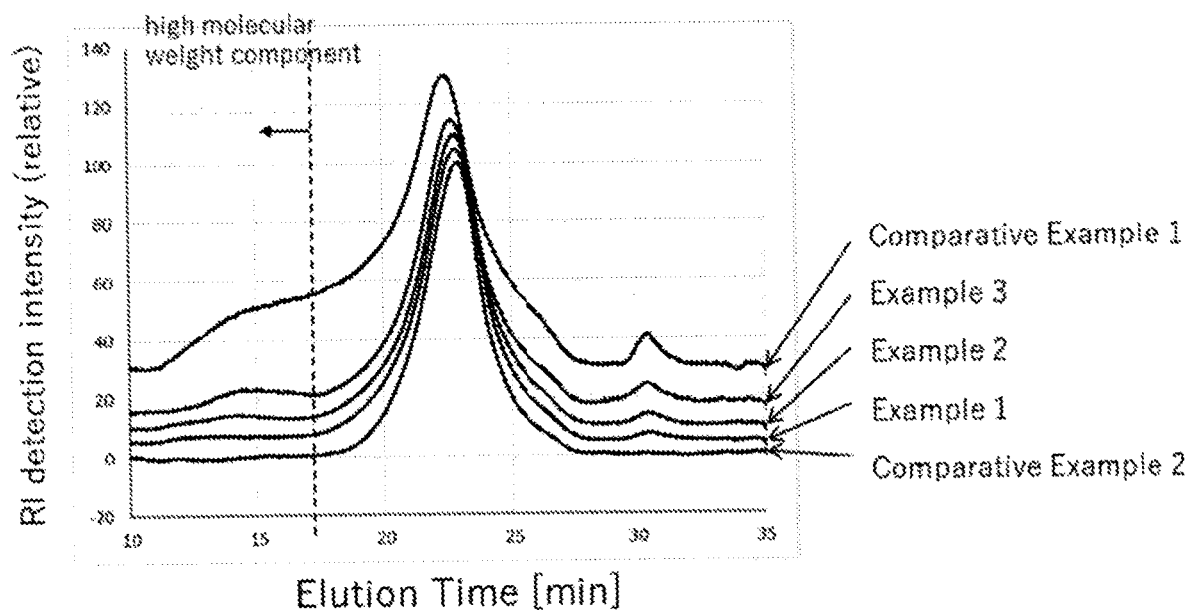
FIGS. 1 (a) and 1 (b) are graphs showing a GPC chromatogram (elution curve) of Examples and Comparative Examples of the present invention.
Figure 1:
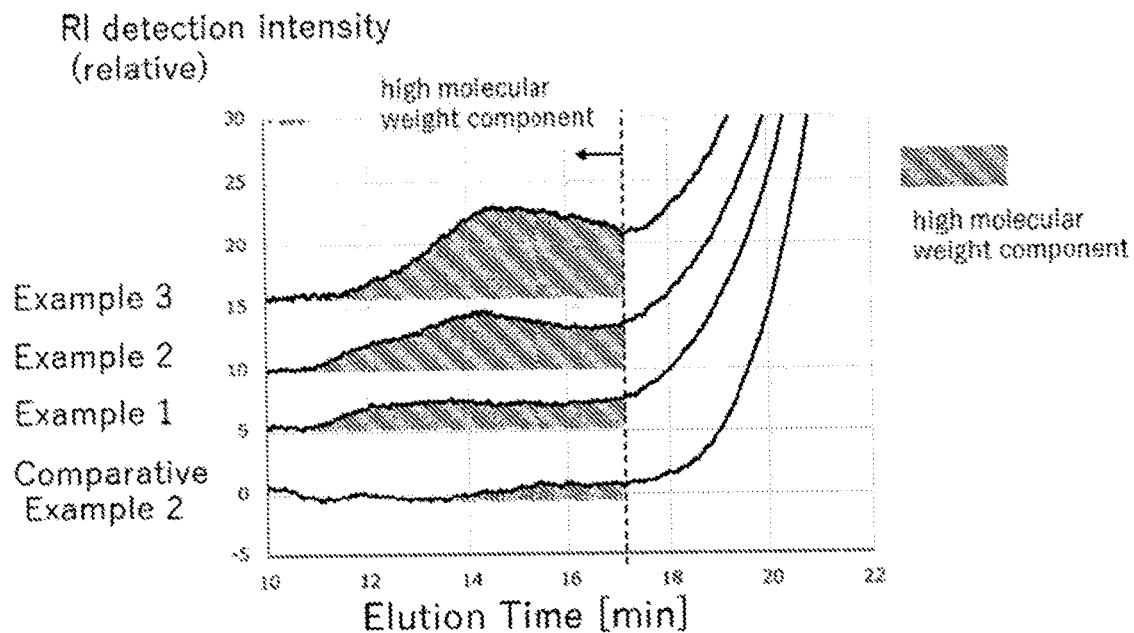

The cellulose resin according to an exemplary embodiment of the present invention is a cellulose derivative in which hydrogen atoms of hydroxy groups of cellulose are substituted with a long-chain component which is a linear aliphatic acyl group having 14 or more carbon atoms and a short-chain component which is at least one of an acyl group having 2 carbon atoms and an acyl group having 3 carbon atoms.

The nitrogen content in the cellulose resin is preferably 300 ppm or more and 2000 ppm or less. A nitrogen component in the cellulose resin is preferably derived from a basic nitrogen-containing group in the cellulose resin, and more preferably, the basic nitrogen-containing group is a pyridine ring-containing group.

According to the exemplary embodiment as described above, a cellulose resin having excellent mechanical properties and thermal decomposition resistance can be obtained.

From the viewpoint of obtaining excellent mechanical properties (particularly impact strength, flexural strength), the nitrogen content in the cellulose resin is preferably 300 ppm or more, more preferably 400 ppm or more, and from the viewpoint of obtaining excellent thermal decomposition resistance, the nitrogen content is preferably 2000 ppm or less, more preferably 1000 ppm or less, and still more preferably 800 ppm or less.

It is preferable that, in a GPC chromatogram (elution curve) of the cellulose resin according to the present exemplary embodiment, measured by gel permeation chromatography (GPC) (standard sample: polystyrene), the GPC chromatogram has a sub-peak or a reading in a region having a molecular weight of 9 million or more, and a content ratio (area ratio) of a high molecular weight component corresponding to the region is in a range of 2 to 10%. By moderately containing such a high molecular weight component, it is possible to have excellent mechanical properties and thermal decomposition resistance.

Here, the sub-peak means a peak having a low peak height with respect to a peak having a highest peak height (main peak) on a lower molecular weight side than the high molecular weight component. The reading means that the main peak becomes broadened on the high molecular weight side.

The peak top molecular weight of the main peak is preferably in the range of 30000 to 1 million, and more preferably in the range of 50000 to 500000.

The area ratio of the high molecular weight component is a ratio (%) of the area of the region of the subpeak or the leading in the area (100%) of the GPC chromatogram (elution curve). The region of the sub-peak or the reading is a region on the high molecular weight side vertically divided at a position of a molecular weight of 9 million of the GPC chromatogram (elution curve).

The condition of GPC measurement can be set to the condition of GPC measurement in the Examples described later.

In addition, in the cellulose resin according to the present exemplary embodiment, the degree of substitution ($DS_{Lo}$) with the long-chain component is preferably in the range of 0.2 to 0.6, and more preferably in the range of 0.3 to 0.5. The degree of substitution ($DS_{Sh}$) with the short-chain component is preferably in the range of 1.7 to 2.8, and more preferably in the range of 1.7 to 2.3. The sum of $DS_{Lo}$ and $DS_{Sh}$ is preferably 2.1 or more.

By increasing the amount of the long-chain component to be introduced, the thermoplastic property and the water resistance of the cellulose resin can be increased. In addition, when the cellulose resin has a long-chain component and a short-chain component in a specific ratio, mechanical properties such as flexural strength, elastic modulus, and impact resistance can be enhanced. From such viewpoint, the number of carbon atoms of the linear aliphatic acyl group which is the long-chain component is preferably 14 or more, more preferably in the range of 14 to 22, and particularly preferably in the range of 16 to 20. As such a linear aliphatic acyl group, a linear saturated aliphatic acyl group is more preferred. Specifically, it is preferable that the long-chain component is an acyl group portion of at least one linear saturated fatty acid selected from myristic acid, palmitic acid, stearic acid, arachidic acid, and behenic acid.

In the cellulose resin according to the exemplary embodiment of the present invention, from the viewpoint of fluidity, water resistance, impact resistance, and the like, the average number of hydroxy groups per glucose unit (hydroxy group remaining degree, $DS_{OH}$) is preferably 0.9 or less.

The cellulose resin according to the exemplary embodiment of the present invention preferably has an Izod impact strength of the molded body of 5.0 kJ/m² or more, and preferably has a thermal decomposition temperature (1% mass reduction temperature in a nitrogen atmosphere) of 280° C. or more. This Izod impact strength is a notched Izod impact strength measured according to JIS K7110.

In the method for producing a cellulose resin according to an exemplary embodiment of the present invention, in the presence of a basic nitrogen-containing organic compound under heating at 100° C. or below, a pulp dispersed in an organic solvent is reacted with a short-chain acylating agent for introducing an acyl group having 2 to 3 carbon atoms and a long-chain acylating agent for introducing an acyl group having 14 or more carbon atoms to acylate hydroxy groups of a cellulose constituting the pulp. Thereafter, the obtained cellulose derivative is separated from a solution containing at least the organic solvent.

The organic solvent is preferably a solvent having a liquid retention ratio of 90% by volume or more with respect to cellulose. N-methylpyrrolidone is preferably used as such an organic solvent (S). The basic nitrogen-containing organic compound (R) is preferably an organic solvent having a liquid retention ratio of 90% by volume or more with respect to cellulose. Pyridine is preferably used as the basic nitrogen-containing organic compound (R). The reaction temperature in the acylation is preferably 50 to 100° C., more preferably 70 to 100° C., and still more preferably 75 to 100° C. The total amount of the organic solvent (S) and the basic nitrogen-containing organic compound (R) is preferably 10 to 50 times the dry mass of the pulp. The mixing ratio (mass ratio R/S) of the basic nitrogen-containing organic compound (R) and the organic solvent (S) is preferably in the range of 5/95 to 30/70. The pulp preferably has a polymerization degree in the range of 100 to 3000, and more preferably in the range of 300 to 700.

(Cellulose)

Cellulose is a straight-chain polymer obtained by polymerizing β-D-glucose (β-D-glucopyranose) molecules represented by the following formula (1) via β(1→4) glycoside bond. Each of glucose units constituting cellulose has three hydroxy groups (where n represents a natural number). In the exemplary embodiment of the present invention, using these hydroxy groups, the short-chain organic group and long-chain organic group can be introduced into the cellulose.

[Formula 1]

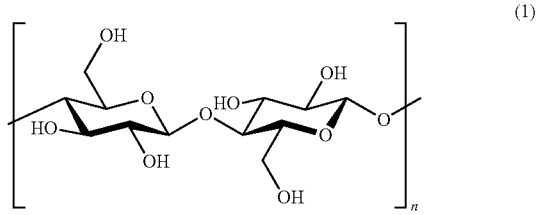

(1)

Cellulose is a main component of a plant and can be obtained by a separation treatment for removing other components such as lignin from a plant. Other than those thus obtained, cotton (for example, cotton linters) having a high cellulose content and pulp (for example, wood pulp) can be used directly or after they are purified. As the shape, size and form of the cellulose or a derivative thereof to be used as a raw material, a powder form cellulose or a derivative thereof having an appropriate particle size and particle shape is preferably used in view of reactivity, solid-liquid separation and handling. For example, a fibrous or powdery cellulose or a derivative thereof having a diameter of 1 to 100 μm (preferably 10 to 50 μm) and a length of 10 μm to 100 mm (preferably 100 μm to 10 mm) can be used.

Regarding the polymerization degree of cellulose, the polymerization degree (DP) preferably is in the range of 100 to 3000, more preferably 300 to 700, and still more preferably 400 to 600. The polymerization degree (DP) of the cellulose (prior to introduction of the long-chain component and the short-chain component) is a value calculated according to the following equation by measuring the intrinsic viscosity number [η] in accordance with JIS P8215.

$$[\eta]=1.67\times DP^{0.71}$$

If the polymerization degree (DP) is too low, the impact resistance of the produced resin may not be sufficient in some cases. Conversely, if the polymerization degree (DP) is too high, the flowability of the produced resin becomes too low, interfering with molding in some cases.

Cellulose may be mixed with a similar structure material such as chitin, chitosan, hemicellulose, xylan, glucomannan, curdlan, paramylon, and the like. When cellulose is mixed with the similar structure material, the amount of the material relative to the total amount of mixture is preferably 30% by mass or less preferably 20% by mass or less and further preferably 10% by mass or less.

The description in the above is directed to cellulose; however, the present invention is applicable to analogs of the cellulose, such as general non-edible polysaccharides, i.e., chitin, chitosan, hemicellulose, xylan, glucomannan, curdlan, paramylon, and the like.

(Long-Chain Component)

The cellulose resin according to an exemplary embodiment of the present invention is a resin formed by introducing a long-chain component as mentioned above in addition to a short-chain component as mentioned above by use of a hydroxy group of a cellulose.

Such a long-chain component can be introduced by reacting a hydroxy group of a cellulose with a long-chain reactant. The long-chain component corresponds to an acyl group introduced in place of the hydrogen atom of a hydroxy group of a cellulose. A long-chain organic group of the long-chain component and a pyranose ring of a cellulose can be bound via an ester bond. The acyl group introduced is a linear saturated aliphatic acyl group having 14 or more carbon atoms. A linear aliphatic acyl group having 14 to 30 carbon atoms is mentioned; a linear aliphatic acyl group having 14 to 22 carbon atoms is preferable; and groups (tetradecanoyl group, hexadecanoyl group, octadecanoyl group, icosanoyl group, docosanoyl group) obtained by removing OH from a carboxyl group of myristic acid, palmitic acid, stearic acid, arachidic acid and behenic acid, are more preferable.

The long-chain reactant is a compound having at least one functional group capable of reacting with a hydroxy group of a cellulose; for example, a compound having a carboxyl group, a carboxylic acid halide group or a carboxylic acid anhydride group can be used.

As the long-chain reactant, for example, a long-chain carboxylic acid having 14 or more carbon atoms and an acid halide or acid anhydride of the long-chain carboxylic acid can be used. The saturation degrees of these carboxylic acids or carboxylic acid derivatives are desirably as high as possible; a linear fatty acid, an acid halide or anhydride thereof is preferable, and a linear saturated fatty acid, an acid halide or anhydride thereof is more preferable. Examples of the long-chain carboxylic acid include linear saturated fatty acids such as myristic acid, pentadecylic acid, palmitic acid, margaric acid, stearic acid, arachidic acid, behenic acid, lignoceric acid, cerotic acid, montanic acid and melissic acid. Myristic acid, palmitic acid, stearic acid, arachidic acid and behenic acid are preferable. Further as the long-chain carboxylic acid, a carboxylic acid obtained from natural products is preferable, in view of environmental harmony.

The long-chain component has preferably 14 or more carbon atoms and particularly preferably 16 or more carbon atoms. In view of reaction efficiency in introducing a long-chain component, the long-chain component has preferably 48 or less carbon atoms, more preferably 36 or less carbon atoms and particularly preferably 24 or less carbon atoms. A single type of a long-chain component may be contained alone, or two types or more of long-chain components may be contained.

In addition, the long-chain component may partially contain an unsaturated bond. In this case, the iodine value is preferably 90 or less, more preferably 50 or less, and still more preferably 20 or less. If the iodine value is too high, the thermal decomposition resistance of the obtained cellulose resin may be reduced.

The average number of long-chain components introduced per glucose unit of a cellulose ($DS_{Lo}$) (long-chain component introduction ratio), in other words, the average number of hydroxy groups substituted with a long-chain component (a linear aliphatic acyl group having 14 or more carbon atoms) per glucose unit (hydroxy group substitution degree) can be set to fall within the range of, for example, 0.2 to 0.6, in accordance with the structure and introduction amount of a short-chain component, the structure of a long-chain component, physical properties required for a desired product and the production efficiency. In order to obtain a more sufficient introduction effect of a long-chain component, $DS_{Lo}$ is preferably 0.2 or more, and more preferably 0.3 or more. In view of production efficiency and durability (e.g., strength, heat resistance), $DS_{Lo}$ is preferably 0.6 or less, and more preferably 0.5 or less.

The properties of a cellulose or a derivative thereof can be improved by introducing a long-chain component as mentioned above into the cellulose or a derivative thereof. More specifically, water resistance, thermoplasticity and mechanical characteristics can be improved.

(Short-Chain Component)

The cellulose resin according to an exemplary embodiment of the present invention is a resin formed by introducing a short-chain component as mentioned above in addition to a long-chain component as mentioned above, using hydroxy groups of a cellulose. As the short-chain component, an acetyl group or a propionyl group is preferred. Or both an acetyl group and a propionyl group may be introduced.

Such a short-chain component can be introduced by reacting a hydroxy group of a cellulose with a short-chain reactant. The short-chain component corresponds to an acyl group moiety introduced in place of a hydrogen atom of a hydroxy group of the cellulose. The short-chain organic group (methyl group or ethyl group) of a short-chain component and the pyranose ring of the cellulose can be bound via an ester bond.

The short-chain reactant is a compound having at least one functional group capable of reacting with a hydroxy group of a cellulose. Examples thereof include compounds having a carboxyl group, a carboxylic acid halide group and a carboxylic acid anhydride group. Specific examples thereof include an aliphatic monocarboxylic acid, an acid halide or acid anhydride thereof.

It is more preferable that the short-chain component has 2 or 3 carbon atoms, and the hydrogen atom of a hydroxy group of the cellulose is replaced with an acyl group (acetyl group or propionyl group) having 2 or 3 carbon atoms.

The average number of short-chain components introduced per glucose unit of a cellulose ($DS_{Sh}$) (short-chain component introduction ratio), in other words, the average number of hydroxy groups substituted with a short-chain component (acetyl group or/and propionyl group) per glucose unit (the substitution degree of hydroxy groups), satisfies the relationship equation of $3 \geq DSL_{Lo} + DS_{Sh}$, and $DS_{Sh}$ can be set to fall within the range of 1.7 to 2.8. In order to obtain a more sufficient effect of introducing a short-chain component, $DS_{Sh}$ is preferably 1.7 or more. Particularly, in view of, e.g., water resistance and flowability, $DS_{Sh}$ is preferably 1.9 or more. In order to obtain the sufficient effect of a long-chain component in addition to the effect of introducing a short-chain component, $DS_{Sh}$ is preferably 2.6 or less, and more preferably 2.3 or less.

By introducing the aforementioned short-chain component into a cellulose or a derivative thereof, the intermolecular force (intermolecular bond) of the cellulose can be reduced; and mechanical characteristics such as elastic modulus, chemical resistance and physical properties such as surface hardness can be enhanced.

The ratio ($DS_{Sh}/DS_{Lo}$) of the introduction ratio of the long-chain component to the introduction ratio of the short-chain component is preferably 4 or more and 12 or less. If the ratio is less than 4, the material tends to become too flexible and accordingly its strength and heat resistance tend to decrease. On the contrary, if the ratio exceeds 12, thermoplasticity becomes insufficient, with the result that it becomes unsuitable for molding applications. In these respects, $DS_{Sh}/DS_{Lo}$ is more preferably 4.5 or more, more preferably 10 or less, and still more preferably 7.5 or less.

The sum of the ratio of the long-chain component and the ratio of the short-chain component ($DS_{Lo}+DS_{Sh}$) is preferably 2.1 or more, more preferably 2.2 or more, more preferably 2.25 or more, from the viewpoint of obtaining adequate introduction effects of the long-chain component and the short-chain component, and more preferably 2.6 or less, more preferably 2.55 or less, from the viewpoint of mechanical characteristics and the like.

(Residual Amount of Hydroxy Groups in Cellulose Resin)

As the residual amount of hydroxy groups increases, the maximum strength and heat resistance of the cellulose resin tend to increase; whereas water absorbability tends to increase. In contrast, as the conversion rate (degree of substitution) of hydroxy groups increases, water absorbability tends to decrease, plasticity and breaking strain tend to increase; whereas, maximum strength and heat resistance tend to decrease. In consideration of these tendencies etc., the conversion rate of hydroxy groups can be appropriately set.

The average number of the remaining hydroxy group per glucose unit (hydroxy group remaining degree, $DS_{OH}$) of a final cellulose resin can be set to fall within the range of 0 to 0.9 (note that, $DS_{Lo}+DS_{Sh}+DS_{OH}=3$). In view of mechanical characteristics such as maximum strength and durability such as heat resistance, a hydroxy group may remain. For example, the hydroxy group remaining degree can be set at 0.01 or more and further 0.1 or more. Particularly, in view of flowability, the hydroxy group remaining degree of a final cellulose resin is preferably 0.1 or more and more preferably 0.2 or more. In view of, e.g., water resistance in addition to flowability, the hydroxy group remaining degree is preferably 0.9 or less. Further in view of, e.g., impact resistance, the hydroxy group remaining degree is preferably 0.6 or less and more preferably 0.5 or less.

(Nitrogen Content of Cellulosic Resin)

In the cellulose resin, there is no nitrogen in terms of its molecular structure. However, in practice, there is a trace amount of nitrogen derived from a raw material such as cellulose or a long-chain component, or an organic solvent used at the time of activation of cellulose to be described later or introduction of a long-chain and short-chain component. In particular, the present inventor has found that a nitrogen content derived from an organic solvent (particularly, a nitrogen-containing organic solvent such as pyridine) used at the time of introducing a long-chain and short-chain component affects mechanical properties and thermal decomposition resistance of a cellulose resin.

In other words, it is considered that the nitrogen-containing organic solvent molecule is slightly coordinated to a portion of the residual hydroxy group or the cellulose reducing terminal aldehyde group of the cellulose resin to become a pseudo-crosslinking point, whereby a plurality of cellulose resin molecules form an aggregate, and a part of the molecular weight is increased to improve mechanical properties such as impact resistance. Specifically, it is considered that a pyridine ring-contain group is generated by the action of, for example, pyridine mainly on a reducing end of cellulose, and a crosslink between celluloses is mainly formed through this pyridine ring-containing group, thereby forming a high molecular weight component. On the other hand, since this crosslinking point affects the thermal decomposition resistance of the cellulose resin, it is necessary to suppress the crosslinking point to a certain level or less in order to enhance the thermal decomposition resistance of the cellulose resin.

The nitrogen content of the final produced cellulose resin is preferably 300 ppm or more from the viewpoint of mechanical properties (particularly, impact resistance). On the other hand, from the viewpoint of heat decomposition resistance, it is preferably 2000 ppm or less, more preferably 1000 ppm or less, and still more preferably 500 ppm or less. If the nitrogen content is too low, aggregates due to cellulose resin molecules are not form, and accordingly the impact resistance is lowered. On the contrary, if the nitrogen content is too high, the crosslinked portion that is easily thermally decomposed increases, and accordingly the thermal decomposition resistance of the cellulose resin decreases.

The nitrogen content of the final produced cellulose resin is affected when the cleaning of the resin is insufficient and a free organic solvent remains, in addition to the above-mentioned coordination. However, such a residual solvent volatilizes at the time of molding (heating and melting) and hence the above effect cannot be obtained. In addition, physical properties may be lowered due to the residual solvent. Therefore, even if the nitrogen content falls within the range of 300 ppm or more and 2000 ppm or less due to the influence of the residual solvent, sufficient mechanical properties and thermal decomposition resistance cannot be obtained.

(Activation of Cellulose)

Before the reaction step for introducing a long-chain component and a short-chain component into a cellulose, an activation treatment (pretreatment step) can be performed in order to increase the reactivity of the cellulose. As the activation treatment, an activation treatment which is routinely performed before acetylation of a cellulose can be applied.

In the activation treatment, a cellulose is swollen by bringing the cellulose into contact with a solvent, for example, by a method of spraying an activation solvent having affinity for a cellulose to the cellulose or by a method (soaking method) of soaking a cellulose in an activation solvent. Owing to the treatment, a reactant easily penetrates between cellulose molecular chains (if a solvent and a catalyst are used, a reactant easily penetrates together with these), with the result that the reactivity of the cellulose improves. Herein, examples of the activation solvent include water; carboxylic acids such as acetic acid, propionic acid, butyric acid, valeric acid, caproic acid, enanthic acid, caprylic acid, pelargonic acid and stearic acid; alcohols such as methanol, ethanol, propanol and isopropanol; nitrogen-containing compounds such as dimethylformamide, formamide, ethanolamine and pyridine; and sulfoxide compounds such as dimethylsulfoxide. These can be used in combination of two or more types. Particularly preferably, water, acetic acid, pyridine and dimethylsulfoxide can be used.

A cellulose can be activated by putting it in a long-chain fatty acid. If the melting point of the long-chain fatty acid is room temperature or more, a cellulose can be heated up to the melting point or more.

The use amount of activation solvent relative to a cellulose (100 parts by mass) can be set to be, for example, 10 parts by mass or more, preferably 20 parts by mass or more and more preferably 30 parts by mass or more. If a cellulose is soaked in an activation solvent, the use amount of activation solvent relative to the cellulose in term of mass, can be set to be, for example, the same or more, preferably 5 times or more and more preferably 10 times or more. In view of load for removing an activation solvent after the pretreatment and cost reduction of materials, the use amount of activation solvent is preferably 300 times or less, more preferably 100 times or less and further preferably 50 times or less.

The temperature of the activation treatment can be appropriately set within the range of, for example, 0 to 100° C. In view of the efficiency of activation and reduction of energy cost, the temperature is preferably 10 to 40° C. and more preferably 15 to 35° C.

When a cellulose is put in a melted long-chain fatty acid, the cellulose can be heated up to melting point or more of the long-chain fatty acid.

The time for the activation treatment can be appropriately set within the range of, for example, 0.1 hour to 72 hours. In order to perform sufficient activation and reduce the treatment time, the time is preferably 0.1 hour to 24 hours and more preferably 0.5 hours to 3 hours.

After the activation treatment, an excessive activation solvent can be removed by a solid-liquid separation method such as suction filtration, filter press and compression.

The activation solvent contained in a cellulose can be substituted with the solvent to be used in the reaction after the activation treatment. For example, a substitution treatment can be performed in accordance with the soaking method for an activation treatment mentioned above by changing the activation solvent to the solvent to be used in the reaction.

(Method for Introducing Long-Chain Component and Short-Chain Component)

A cellulose derivative (cellulose resin) according to an exemplary embodiment can be produced in accordance with the method shown below.

A process for producing a cellulose derivative according to an exemplary embodiment includes a step of acylating hydroxy groups of a cellulose constituting pulp by reacting, in an organic solvent, the pulp dispersed in the organic solvent, a short-chain reactant (short-chain acylating agent) and a long-chain reactant (long-chain acylating agent) in the presence of an acid trapping component while warming. It is preferable that the short-chain reactant (short-chain acylating agent) and the long-chain reactant (long-chain acylating agent) are dissolved in the solvent. The acid trapping component may be also used as a solvent.

As a long-chain reactant for introducing a long-chain component in a cellulose, an acid chloride of a linear saturated fatty acid as mentioned above is preferable. A single type of a long-chain reactant may be used alone or two types or more of long-chain reactants may be used in combination. As a short-chain reactant for introducing a short-chain component in a cellulose, one selected from acetyl chloride, acetic anhydride, and propionyl chloride is preferable, and one kind thereof may be used alone, or two or more kinds thereof may be used in combination.

The addition amounts of the long-chain reactant and short-chain reactant can be set in accordance with the degree of substitution ($DS_{Lo}$) with a long-chain component and the degree of substitution ($DS_{Sh}$) with a short-chain component in a desired cellulose derivative. If the short-chain reactant is excessively present, the binding amount of a long-chain component decreases and the degree of substitution ($DS_{Lo}$) with a long-chain component tends to decrease.

As the organic solvent, a solvent providing a liquid holding rate by cellulose: 90 vol % or more, is preferably used.

The "liquid holding rate" can be measured as follows.

Filter paper (5B, 40 mmϕ, water content: about 2%) made of cotton fiber is soaked in each solvent at room temperature for one hour. The weights of the filter paper before and after soaking are measured and assigned to the following expression. In this manner, a liquid holding rate (vol %) is obtained. The weight of a sample after soaking is measured at the time when dripping of a solvent from the sample is stopped.

Liquid holding rate (vol %)=(weight after soaking–weight before soaking)/weight before soaking/specific gravity of solvent×100

Examples of a solvent providing a liquid holding rate of 90 vol % or more, include water (liquid holding rate: 145 vol %), acetic acid (liquid holding rate: 109 vol %), dioxane (liquid holding rate: 93 vol %), pyridine (liquid holding rate: 109 vol %), N-methyl pyrrolidone (liquid holding rate: 104 vol %), N,N-dimethylacetamide (liquid holding rate: 112 vol %), N,N-dimethylformamide (liquid holding rate: 129 vol %) and dimethylsulfoxide (liquid holding rate: 180 vol %). Among them, a nitrogen-containing solvent (pyridine, N-methyl pyrrolidone, N,N-dimethylacetamide, N,N-dimethylformamide) is particularly preferred from the viewpoint of forming a crosslinking point with nitrogen as described above.

An acid trapping component is not particularly limited as long as it is a base neutralizing an acid (e.g., hydrochloric acid, acetic acid, propionic acid) produced as a by-product. Examples thereof include alkaline metal hydroxides such as sodium hydroxide and potassium hydroxide; alkaline earth metal hydroxides such as calcium hydroxide and barium hydroxide; metal alkoxides such as sodium methoxide, sodium ethoxide; and nitrogen-containing nucleophilic compounds such as diazabicycloundecene, diazabicyclononene, triethylamine and pyridine. Of them, triethylamine and pyridine are preferable, and pyridine is particularly preferable because they can be used also as a solvent. When an acid trapping component is added independently of a solvent, it is preferable that the acid trapping component is present in a reaction system from the initiation time of a reaction. As long as an acid trapping component is present in a reaction system from the initiation time of a reaction, an acid trapping component may be added before or after addition of an acylating agent.

The addition amount of an acid trapping component relative to the total amount of a starting long-chain reactant (long-chain acylating agent) and a starting short-chain reactant (short-chain acylating agent) is preferably 0.1 to 10 equivalents and more preferably 0.5 to 5 equivalents. However, when a nitrogen-containing nucleophilic compound is used as a solvent, the addition amount of an acid trapping component is not limited the above range. If the addition amount of an acid trapping component is small, an acylation reaction efficiency decreases. In contrast, if the addition amount of an acid trapping component is large, the cellulose may be decomposed and sometimes reduced in molecular weight.

The reaction temperature in the acylation step is preferably 50 to 100° C., more preferably 70 to 100° C., and still more preferably 75 to 100° C. The reaction time can be set from 2 hours to 5 hours, and is preferably set from 3 hours to 4 hours. If the reaction temperature is sufficiently high, the reaction speed can be increased, with the result that an acylation reaction can be completed in a relative short time and the reaction efficiency can be increased. If the reaction temperature falls within the above range, a decrease in molecular weight by heating can be suppressed.

The amount of an organic solvent can be set to be 10 to 50 times and preferably 10 to 40 times (mass ratio) as large as the amount (dry mass) of the raw material pulp.

(Aging Step)

After the above acylation step, an aqueous alkaline solution is added, and the reaction solution is preferably held (aged) as it is while warming. The temperature during the aging is preferably 25 to 75° C. and preferably 40 to 70° C. The time for aging can be set to fall within the range of 1 to 5 hours and preferably 1 to 3 hours.

The addition amount of an aqueous alkaline solution can be set so as to correspond to 3 to 30% by mass relative to the solvent to be used, and preferably 5 to 20% by mass.

As the aqueous alkaline solution, aqueous solutions of, e.g., potassium hydroxide, sodium carbonate and sodium hydrogen carbonate are mentioned, and an aqueous solution of sodium hydroxide is preferable. The concentration of an aqueous alkaline solution is preferably 1 to 30% by mass and more preferably 5 to 20% by mass.

Owing to such an aging step, the long-chain component and the short-chain component once bound are partially hydrolyzed to come back to (homogeneous) hydroxy groups, with the result that mechanical characteristics such as strength and impact resistance can be enhanced. In addition, in the following precipitation step, a product having satisfactory properties (fine granules) can be obtained.

(Recovery Step)

A cellulose derivative (product), which is formed by introducing a long-chain component and a short-chain component, can be recovered from a reaction solution in accordance with a recovery method generally used. The recovery method is not limited; however, if a product is not dissolved in a reaction solution, a solid-liquid separation method for separating a reaction solution and a product is preferable in view of production energy. If it is difficult to separate a solid and a liquid because a product is dissolved in or compatible with a reaction solution, the reaction solution is distilled off and a product can be recovered as the residue. Alternatively, a poor solvent for a product is added to the reaction solution to precipitate the product, which may be recovered by solid-liquid separation.

When a reaction solution is distillated, it is preferable to use a short-chain reactant, a reaction solvent and a catalyst having low boiling points. The catalyst can be removed from a product with, e.g., a washing solvent without distillation. When components except a product, such as a solvent, are distilled away from a reaction solution, distillation is stopped when a product is precipitated, and then, the remaining reaction solution and the precipitated product can be subjected to solid-liquid separation to recovery the product.

As the solid-liquid separation method, e.g., filtration (natural filtration, filtration under reduced pressure, pressure filtration, centrifugal filtration and these while applying heat), spontaneous sedimentation and flotation, separation (by funnel), centrifugal separation and squeeze, are mentioned. These can be used appropriately in combination.

A product (a cellulose derivative) dissolved in a filtrate after the solid-liquid separation can be precipitated by adding a poor solvent for the product and further subjected to solid-liquid separation to recover it.

The solid content (a cellulose derivative) recovered from a reaction solution is, if necessary washed and dried by a method generally employed.

The cellulose derivative produced by this method can possess a reinforcing crystal structure due to a cellulose main-chain crystal in a thermoplastic matrix. This is derived from an unreacted part when a cellulose material is acylated. Such a cellulose main-chain crystal can be evaluated, for example, by X-ray diffractometry. At the time of evaluation, for example, a cellulose derivative can be pressed to increase the density, thereby facilitating detection of a signal.

(Other Process for Producing Cellulose Derivative)

A cellulose resin can be obtained by acylating a cellulose in a solid-liquid heterogeneous system using a mixed acid anhydride containing a long-chain component and a short-chain component, as an acylating agent. Cellulose is preferably activated. The activation treatment can be performed by a method generally used.

After completion of the reaction, a poor solvent such as a water/methanol solvent mixture, is added to allow a product dissolved in the liquid phase to sufficiently precipitate, and then, solid-liquid separation can be performed to recover a product. Thereafter, washing and drying can be made.

Acylation can be performed in a homogeneous solution system in which a cellulose and an acylating agent are homogenously dissolved in a solvent. A cellulose is preferably activated. The activation treatment can be performed by a method generally used.

As a solvent for acylation, a solvent such as N,N-dimethylacetamide, which can dissolve a cellulose, is used.

As the acylating agent, a mixed acid anhydride having a long-chain component and a short-chain component, which is produced in the same solvent as the solvent to be used in acylation, can be used.

After completion of the reaction, a poor solvent such as methanol is added to precipitate a product, which may be recovered by solid-liquid separation. Thereafter, washing and drying can be made.

(Molding Resin Composition and Additives)

The cellulose derivative according to an exemplary embodiment of the present invention can provide a resin composition suitable as a molding material by adding additives in accordance with desired properties. The cellulose derivative can be compatible with an additive which is compatible with a general cellulose derivative.

To the cellulose derivative according to an exemplary embodiment of the present invention, various types of additives usually used in thermoplastic resins can be applied. For example, if a plasticizer is added, thermoplasticity and breaking elongation while breaking can be more improved. Examples of such a plasticizer include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetylcitrate; epoxylated vegetable oils such as epoxylated soybean oil and epoxylated linseed oil; castor oil and a derivative thereof; benzoic acid esters such as ethyl O-benzoyl benzoate; aliphatic dicarboxylic acid esters such as sebacate and azelate; unsaturated dicarboxylic acid esters such as maleate; and N-ethyl toluene sulfonamide, triacetin, O-cresyl p-toluenesulfonate and tripropionin. Particularly of them, if a plasticizer such as dioctyl adipate, benzyl adipate-2 butoxyethoxyethyl, tricresyl phosphate, diphenylcresyl phosphate or diphenyl octyl phosphate is added, not only thermoplasticity and breaking elongation but also shock resistance can be effectively improved.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

To the cellulose derivative according to an exemplary embodiment of the present invention, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils. Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

To the cellulose derivative according to an exemplary embodiment of the present invention, if necessary, a flame retardant can be added. By adding a flame retardant, flame resistance can be imparted. Examples of the flame retardant include metal hydrates such as magnesium hydroxide, aluminum hydroxide and hydrotalcite, basic magnesium carbonate, calcium carbonate, silica, alumina, talc, clay, zeolite, bromine-based flame retardant, antimony trioxide, phosphoric acid based flame retardant (aromatic phosphate, aromatic condensed phosphate, etc.), compounds containing phosphorus and nitrogen (phosphazene compound), etc. These flame retardants can be used singly or in combination with two or more types.

To the cellulose derivative according to an exemplary embodiment, if necessary, a shock resistance improver can be added. By adding a shock resistance improver, shock resistance can be improved. Examples of the shock resistance improver include a rubber component and a silicone compound. Examples of the rubber component include a natural rubber, epoxylated natural rubber and synthesized rubber. Furthermore, examples of the silicone compound include organic polysiloxane formed by polymerization of alkyl siloxane, alkyl phenyl siloxane, etc. and modified silicone compounds obtained by modifying a side chain or an end of an organic polysiloxane as mentioned above with polyether, methylstyryl, alkyl, higher fatty acid ester, alkoxy, fluorine, an amino group, an epoxy group, a carboxyl group, a carbinol group, a methacryl group, a mercapto group, a phenol group etc. These shock resistance improvers can be used singly or in combination of two or more types.

As the silicone compound, a modified silicone compound (modified polysiloxane compound) is preferred. As the modified silicone compound, a modified polydimethyl siloxane is preferred, which has a structure having a main chain constituted of dimethyl siloxane repeat units and a side chain or a terminal methyl group partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group. The modified silicone compound, because of the presence of such an organic substituent, is improved in affinity for the aforementioned cellulose derivative and dispersibility in the cellulose derivative is improved. Consequently, a resin composition excellent in shock resistance can be obtained.

As such a modified silicone compound, a modified silicone compound produced in accordance with a conventional method can be used.

Examples of the organic substituent contained in the modified silicone compound include the organic substituents represented by the following formulas (2) to (20) are mentioned:

[Formula 2]

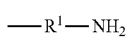

(2)

(3)

[Formula 3]

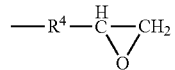

(4)

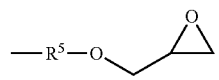

(5)

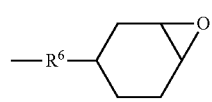

(6)

[Formula 4]

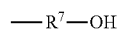

(7)

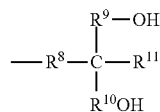

(8)

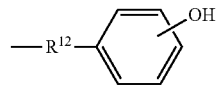

(9)

—R$^{13}$—SH (10)

[Formula 5]

—R$^{14}$COOH (11)

[Formula 6]

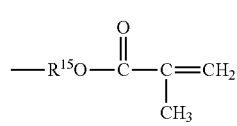

(12)

—R$^{16}$ (13)

[Formula 7]

[Formula 8]

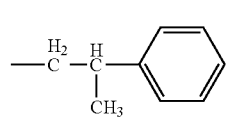

(14)

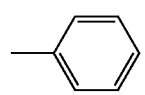

(15)

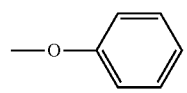

(16)

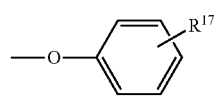

(17)

[Formula 9]

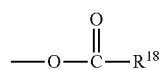

(18)

-continued

[Formula 10]

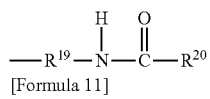
(19)

[Formula 11]

(20)

In the above formulas, a and b each represent an integer of 1 to 50.

In the aforementioned formulas, $R^1$ to $R^{10}$, $R^{12}$ to $R^{15}$, $R^{19}$ and $R^{21}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —$(CH_2$—$CH_2$—$O)c$-(c represents an integer from 1 to 50), —$[CH_2$—$CH (CH_3)$—$O]_d$-(d represents an integer from 1 to 50), and —$(CH_2)e$-NHCO-(e represents an integer from 1 to 8). Of these, an alkylene group is preferable and particularly, an ethylene group and a propylene group are preferable.

In the aforementioned formulas, $R^{11}$, $R^{16}$ to $R^{18}$, $R^{20}$ and $R^{22}$ each represent an alkyl group having at most 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

The total average content of organic substituents in a modified silicone compound desirably falls within the range where the modified silicone compound having an appropriate particle diameter (for example, 0.1 μm or more and 100 μm or less) can be dispersed in a matrix, i.e., a cellulose derivative, during a process for producing a cellulose derivative composition. If a modified silicone compound having an appropriate particle diameter is dispersed in a cellulose derivative, stress concentration on the periphery of a silicone region having a low elastic modulus effectively occurs. As a result, a resin molded body having excellent shock resistance can be obtained. The total average content of such organic substituents is preferably 0.01% by mass or more and more preferably 0.1% by mass or more, and also preferably 70% by mass or less and more preferably 50% by mass or less. If an organic substituent is contained appropriately, the modified silicone compound can be improved in affinity for a cellulose resin, the modified silicone compound having an appropriate particle diameter can be dispersed in a cellulose derivative, and further bleed out due to separation of the modified silicone compound in a molding can be suppressed. If the total average content of the organic substituents is excessively low, it becomes difficult to disperse a modified silicone compound having an appropriate particle diameter in a cardanol-added cellulose resin.

If an organic substituent of the modified polydimethyl siloxane compound is an amino group, an epoxy group, a carbinol group, a phenol group, a mercapto group, a carboxyl group or a methacryl group, the average content of the organic substituent in the modified polydimethyl siloxane compound can be obtained by the following Expression (I).

Organic substituent average content (%)=(organic substituent formula-weight/organic substituent equivalent)×100 (I)

In the Expression (I), the organic substituent equivalent is an average mass of a modified silicone compound per organic substituent (1 mole).

When the organic substituent of the modified polydimethyl siloxane compound is a phenoxy group, an alkylphenoxy group, a long-chain alkyl group, an aralkyl group, a long-chain fatty acid ester group or a long-chain fatty acid amide group, the average content of the organic substituent of the modified polydimethyl siloxane compound can be obtained from the following Expression (II).

Organic substituent average content (%)=$x$×$w$/[(1−$x$)×74+$x$×(59+$w$)]×100 (II)

In the Expression (II), x is an average molar fraction of the organic substituent-containing a siloxane repeat unit relative to all siloxane repeat units of the modified polydimethyl siloxane compound; and w is the formula weight of the organic substituent.

In the case where the organic substituent of the modified polydimethyl siloxane compound is a phenyl group, the average content of the phenyl group in the modified polydimethyl siloxane compound can be obtained by the following Expression (III).

Phenyl group average content (%)=154×$x$/[74×(1−$x$)+198×$x$]×100 (III)

In the Expression (III), x is an average molar fraction of the phenyl group-containing siloxane repeat unit relative to all siloxane repeat units in the modified polydimethyl siloxane compound (A).

In the case where the organic substituent of the modified polydimethyl siloxane compound is a polyether group, the average content of the polyether group in the modified polydimethyl siloxane compound can be obtained by the following Expression (IV).

Polyether group average content (%)=HLB value/20×100 (IV)

In the Expression (IV), the HLB value represents the degree of affinity of a surfactant for water and oil, and is defined by the following Expression (V) based on the Griffin Act.

HLB value=20×(sum of formula weights of hydrophilic moieties/molecular weight) (V)

To the cellulose derivative of the exemplary embodiment, two or more modified silicone compounds having different affinities to the derivative may be added. In this case, dispersibility of a relative low-affinity modified silicone compound (A1) is improved by a relative high-affinity modified silicone compound (A2) to obtain a cellulose resin composition having even more excellent shock resistance. The total average content of an organic substituent of the relatively low-affinity modified silicone compound (A1) is preferably 0.01% by mass or more and more preferably 0.1% by mass or more and also preferably 15% by mass or less and more preferably 10% by mass or less. The total average content of an organic substituent of the relatively high-affinity modified silicone compound (A2) is preferably 15% by mass or more and more preferably 20% by mass or more and also preferably 90% by mass or less.

The blending ratio (mass ratio) of the modified silicone compound (A1) to the modified silicone compound (A2) can be set to fall within the range of 10/90 to 90/10.

In a modified silicone compound, dimethyl siloxane repeat units and organic substituent-containing siloxane repeat units each of which may be homologously and continuously connected, alternately connected or connected at random. A modified silicone compound may have a branched structure.

The number average molecular weight of a modified silicone compound is preferably 900 or more and more preferably 1000 or more, and also preferably 1000000 or less, more preferably 300000 or less and further preferably 100000 or less. If the molecular weight of a modified silicone compound is sufficiently large, loss by vaporization can be suppressed in kneading with a melted cellulose derivative during a process for producing a cellulose derivative composition. Furthermore, if the molecular weight of a modified silicone compound is appropriate (not excessively large), a uniform molding having good dispersibility can be obtained.

As the number average molecular weight, a value (calibrated by a polystyrene standard sample) obtained by measuring a 0.1% chloroform solution of a sample by GPC can be employed.

The addition amount of such a modified silicone compound is preferably, in view of obtaining sufficient addition effect, 1% by mass or more relative to the total cellulose derivative composition and more preferably 2% by mass or more. In view of sufficiently ensuring properties of a cellulose resin such as strength and suppressing bleed out, the addition amount of a modified silicone compound is preferably 20% by mass or less and more preferably 10% by mass or less.

By adding such a modified silicone compound to a cellulose derivative, the modified silicone compound having an appropriate particle diameter (for example, 0.1 to 100 µm) can be dispersed in the resin and the shock resistance of a resin composition can be improved.

To the cellulose derivative of the exemplary embodiment, if necessary, additives such as a colorant, an antioxidant and a heat stabilizer may be added as long as they are applied to conventional resin compositions.

To the cellulose derivative of the exemplary embodiment, if necessary, a general thermoplastic resin may be added.

As the thermoplastic resin, a polyester can be added and a straight-chain aliphatic polyester can be preferably used. As the straight-chain aliphatic polyester (Y), the following straight-chain aliphatic polyesters (Y1) and (Y2) are preferable, for example, polybutylene succinate, polybutylene succinate adipate and polycaprolactone can be mentioned.

(Y1) Straight-chain aliphatic polyester containing at least one of repeating units represented by the following formula (21) and formula (22)

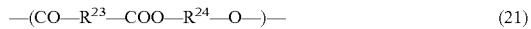

$$-(CO-R^{23}-COO-R^{24}-O-)- \quad (21)$$

$$(CO-R^{25}-O-)- \quad (22)$$

In the formula (21), $R^{23}$ represents a divalent aliphatic group having carbon atoms of 1 to 12, preferably 2 to 8 and more preferably 2 to 4; and $R^{24}$ represents a divalent aliphatic group having carbon atoms of 2 to 12, preferably 2 to 8 and more preferably 2 to 4.

In the formula (22), $R^{25}$ represents a divalent aliphatic group having carbon atoms of 2 to 10, preferably 2 to 8 and more preferably 2 to 4.

(Y2) Straight-chain aliphatic polyester composed of a product obtained by ring-opening polymerization of a cyclic ester.

The straight-chain aliphatic polyester (Y1) can be obtained by a condensation reaction between at least one selected from the group consisting of, for example, an aliphatic dicarboxylic acid, an acid anhydride thereof and a diester thereof, and an aliphatic diol.

The aliphatic dicarboxylic acid has carbon atoms of, for example, 3 to 12, preferably 3 to 9, more preferably 3 to 5. The aliphatic carboxylic acid is, for example, an alkane dicarboxylic acid. Specific examples thereof include malonic acid, succinic acid, adipic acid, sebacic acid, azelaic acid and dodecane dicarboxylic acid. The aliphatic dicarboxylic acids, for example, may be used alone or in combination of two or more.

The aliphatic diol has carbon atoms of, for example, 2 to 12, preferably 2 to 8 and more preferably 2 to 6. The aliphatic diol is, for example, an alkylene glycol. Specific examples thereof include ethylene glycol, 1,3-propylene glycol, 1,4-butane diol, 1,6-hexane diol, 1,9-nonane diol, 1,10-decane diol and 1,12-dodecane diol. Of them, a straight-chain aliphatic diol having 2 to 6 carbon atoms is preferable, and particularly, ethylene glycol, 1,3-propylene glycol, 1,4-butane diol and 1,6-hexane diol are preferable. The aliphatic diols, for example, may be used alone or in combination of two or more.

The straight-chain aliphatic polyester (Y2) is a straight-chain aliphatic polyester obtained by ring-opening polymerization of a cyclic ester. The cyclic ester is, for example, lactone having carbon atoms of 2 to 12. Specific examples thereof include, α-acetolactone, β-propiolactone, γ-butyrolactone and δ-valerolactone. The cyclic esters, for example, may be used alone or in combination with two or more.

The number average molecular weight of the straight-chain aliphatic polyester (Y) is not particularly limited. The lower limit thereof is preferably, for example, 10000 or more, and more preferably 20000 or more. The upper limit thereof is preferably, for example, 200000 or less and more preferably 100000 or less. The aliphatic polyester having a molecular weight within the above range can provide, for example, a more uniform molded body having more excellent dispersibility.

As the number average molecular weight, for example, a value (calibrated by a polystyrene standard sample) obtained by measuring a 0.1% chloroform solution of a sample by GPC can be employed.

By adding a thermoplastic resin having excellent flexibility such as a thermoplastic polyurethane elastomer (TPU) to the cellulose derivative according to an exemplary embodiment, shock resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment.

The thermoplastic polyurethane elastomer (TPU) suitable for improving shock resistance that can be used includes a polyurethane elastomer prepared by using a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent shock resistance can be obtained.

These thermoplastic polyurethane elastomers (TPU) may be used singly or in combination.

A process for producing a resin composition containing the cellulose derivative according to an exemplary embodiment of the present invention, additives and a thermoplastic resin, is not particularly limited. For example, the resin composition can be produced by melting and mixing additives and the cellulose resin manually by handmixing or by use of a known mixer such as a tumbler mixer, or a ribbon blender, a single-axial or a multiaxial mixing extruder, and a compounding apparatus such as a kneader and kneading roll and, if necessary, granulating the mixture into an appropriate shape. In another preferable process, additives dispersed in solvent such as an organic solvent and a resin are mixed and furthermore, if necessary, a coagulation solvent is added to obtain a mixed composition of the additives and the resin and thereafter, the solvent is evaporated.

The cellulose resin according to the exemplary embodiments mentioned above can be used as a base resin for a molding material (resin composition). The molding material using the cellulose resin as a base resin is suitable for forming a molded body such as housing, e.g. packaging for an electronic device.

The base resin herein refers to a main component of the molding material and means that other components may be contained as long as the components do not prevent the function of the main component. The content rate of the main component is not particularly limited; however, the content rate of the main component in a composition is 50% by mass or more, preferably 70% by mass or more, more preferably 80% by mass or more and particularly preferably 90% by mass or more.

EXAMPLES

Hereinafter, the present invention will be described in more detail with reference to specific examples.
[Measurement of Polymerization of Pulp]
The limiting viscosities [η] of the pulp used for producing the cellulose resins were measured in accordance with the JIS P8215, and the polymerization degree (DP) of the pulp was calculated according to the equation (VI).

$$[\eta]=1.67 \times DP^{0.71} \tag{VI}$$

Example 1

After the activation treatment of cellulose (pulp), the cellulose (pulp) was acylated in a solid-liquid heterogeneous system to obtain a cellulose resin. Specifically, the cellulose resin (cellulose propionate stearate) was prepared according to the following.

Six grams (in terms of dry weight, 37 mmol/glucose unit) of cellulose (dissolved pulp powder, water content: 6.4%, DP: 560) was put into a reactor, dispersed in a mixed solution of 12 ml of pyridine and 78 ml of N-methylpyrrolidone under a nitrogen atmosphere, and stirred at room temperature overnight for activation.

Thereafter, the cellulose dispersion was cooled to about −4° C., and 7.28 g (24 mmol) of stearoyl chloride and 10.27 g (111 mmol) of propionyl chloride were mixed in advance, and dropped into the reactor while maintaining the internal temperature at 3° C. or less.

Subsequently, the temperature was increased and stirred while heating at 100° C. for 4 hours. Thereafter, the mixture was cooled to 65° C., and 90 ml of methanol was charged and stirred for about 30 minutes.

Further 20 ml of water was added to precipitate the product dissolved in the reaction solution. The solid content containing the precipitate and the undissolved material after the reaction was collected by suction filtration. The resulting solid was washed with 100 ml of methanol until the color of the filtrate disappeared (4 times).

The washed solid content was dried in vacuo at 105° C. for 5 hours to obtain 13.9 g (yield: 94%) of a powdery cellulosic resin (cellulose propionate stearate).

The obtained sample (cellulose propionate stearate) was measured by $^1$H-NMR (AV-400, manufactured by Bruker Corporation, 400 MHz, solvent: CDCl$_3$), and as a result, $DS_{Lo}$ was 0.44, and $DS_{Sh}$ was 2.16.

Furthermore, this sample was evaluated according to the following. The results are shown in Table 1.

[Measurement of Nitrogen Content].

For the obtained sample, the nitrogen content in the sample was measured under the conditions described in JIS K2609:1998 4. chemiluminescence method.

[Preparation of Injection Molded Body for Evaluation]

A molded body having the following shape was formed from the samples obtained above by using an injection molding machine (HAAKE MiniJet II, manufactured by Thermo Electron Corporation) and setting the following conditions.

Size of the molded body: thickness: 2.4 mm, width: 12.4 mm, length: 80 mm Molding conditions: cylinder temperature of the molding machine: 220° C., temperature of a mold: 60° C., injection pressure: 1200 bar (120 MPa) for 5 seconds, and holding pressure: 600 bar (60 MPa) for 20 seconds.

[Measurement of Izod Impact Strength]

The molded bodies obtained above were subjected to measurement of notched Izod impact strength performed in the conditions described in JIS K7110.

The obtained data were evaluated in accordance with the following criteria.

Criteria for evaluation of Izod impact strength:
  ○: 5.0 kJ/m$^2$ or more
  x: less than 5.0 kJ/m$^2$

[Measurement of Flexural Strength]

For the molded bodies described above, using a universal testing machine INSTRON5567 manufactured by Instron corporation, flexural strength was measured by performing a three-point bending test under the following conditions.

Bending test conditions: distance between fulcrums 32 mm, test speed 1 mm/min

The obtained data were evaluated in accordance with the following criteria.

Criteria for evaluation of flexural strength:
  ○: 40 MPa or more
  x: less than 40 MPa

[Measurement of Thermal Decomposition Resistance]

Thermogravimetric analysis was performed using a thermogravimetric analyzer (product name: TGA-6200, manufactured by Hitachi High-Tech Corporation) under a nitrogen atmosphere (0.2 L/min), a starting temperature of 20° C., an end temperature of 800° C., and a temperature rising rate of 10° C./min. The obtained 1% weight-loss temperature ($Td_{1\%}$) was used as an index of thermal decomposition resistance, and evaluated in accordance with the following criteria.

Criteria for evaluation thermal resistance
  ○: $Td_{1\%}$ 280° C. or higher
  x: $Td_{1\%}$ less than 280° C.

[GPC Measurement].

Using gel permeation chromatography (manufactured by Shimadzu Corporation, product name LC-20AD), molecular weight analysis was performed under the following equipment conditions.

Columns: two GPC-80M and one GPC-8025 connected in series
Mobile phase: chloroform (1.0 ml/min)
Detector: differential refractive index detector (RID-10A)

Standard Sample: polystyrene (molecular weight: 8650000 (manufactured by TOSOH CORPORATION), 1810000 (manufactured by TOSOH CORPORATION), 460000 (manufactured by SHOWA DENKO K.K.), 156000 (manufactured by SHOWA DENKO K.K.), 66000 (manufactured by SHOWA DENKO K.K.), 11600 (manufactured by SHOWA DENKO K.K.), 3250 (manufactured by SHOWADENKO K.K.), 1680 (manufactured by SHOWADENKO K.K.))

As a result, the chromatogram shown in FIG. 1 (*a*)-1 (*b*) was obtained (in the FIGURE, the vertical axis shows the RI detection intensity, and the horizontal axis shows the elution time (minutes)). The elution time corresponding to a molecular weight of 9 million was 17.15 min (indicated by the dotted line in the FIGURE), and the component with an earlier elution time (the region on the left side divided vertically by the dotted line in the FIGURE) was defined as the high molecular weight component. From FIG. 1 (*a*)-1 (*b*), it can be seen that the high molecular weight component is formed. Incidentally, FIG. 1 (*a*) shows the entire GPC chromatogram obtained, and FIG. 1 (*b*) is an enlarged view of the region on the high molecular weight component side of the GPC chromatogram.

Furthermore, the content ratio (area ratio) of the high molecular weight component was determined from the obtained chromatogram. This content ratio (area ratio) was defined as the ratio (%) of the area of the region corresponding to the high molecular weight component (corresponding to the hatched portion in FIG. 1(*b*)) in the area of the region surrounded by the entire obtained elution curve (including the main peak and the sub-peak or the reading) and the baseline of the elution curve. Note that the area of the peak on the low molecular weight side (peak around the elution time of 31 minutes) was also included in the area of the entire region and calculated.

[Pyrolysis GC/MS]

Pyrolysis GC/MS analysis was performed using gas chromatograph mass spectrometry (manufactured by JEOL Ltd., product name JMS-Q1050GC) under the conditions of a heating furnace temperature of 210° C., a heating time of 0.5 minutes, and a separation column SPB-20. As a result, a cracked gas containing a pyridine ring was confirmed.

Example 2

A cellulosic resin (cellulose propionate stearate) was produced according to the same amount and method as in Example 1, except that the temperature at the time of heating and stirring was changed to 90° C. (yield: 13.5 g, yield ratio: 94%).

The obtained sample (cellulose propionate stearate) was measured by $^1$H-NMR in the same manner as in Example 1, and as a result, $DS_{Lo}$ was 0.41 and $DS_{Sh}$ was 2.12.

In addition, this sample was measured and evaluated for nitrogen content, impact strength, flexural strength and thermal decomposition resistance according to the same method as in Example 1. The results are shown in Table 1. Furthermore, the sample was analyzed by GPC measurement and pyrolysis GC/MS in the same manner as in the example. The obtained chromatogram was shown in FIG. 1 (*a*)-1 (*b*). From FIG. 1 (*a*)-1 (*b*), it can be seen that a high molecular weight component is formed. The content ratio of the high molecular weight component is shown in Table 1. As a result of analysis by pyrolysis GC/MS, a pyridine ring was confirmed.

Example 3

A cellulosic resin (cellulose propionate stearate) was produced according to the same amount and method as in Example 1, except that the temperature at the time of heating and stirring was changed to 80° C. (yield: 13.0 g, yield ratio: 92%).

The obtained sample (cellulose propionate stearate) was measured by $^1$H-NMR in the same manner as in Example 1, and as a result, $DS_{Lo}$ was 0.39 and $DS_{Sh}$ was 2.07.

In addition, this sample was measured and evaluated for nitrogen content, impact strength, flexural strength and the thermal decomposition resistance according to the same method as in Example 1. The results are shown in Table 1. Furthermore, the sample was analyzed by GPC measurement and pyrolysis GC/MS in the same manner as in the example. The obtained chromatogram was shown in FIG. 1 (a)-1 (b). From FIG. 1 (a)-1 (b), it can be seen that a high molecular weight component is formed. The content ratio of the high molecular weight component is shown in Table 1. As a result of analysis by pyrolysis GC/MS, a pyridine ring was confirmed.

Comparative Example 1

Six grams (in terms of dry weight, 37 mmol/glucose unit) of cellulose (dissolved pulp powder, water content: 6.4%, DP:560) was put into a reactor, dispersed in 90 ml of pyridine under a nitrogen atmosphere, and stirred at room temperature overnight for activation.

Thereafter, the cellulose dispersion was cooled to about 10° C., and 7.28 g (24 mmol) of stearoyl chloride and 10.28 g (111 mmol) of propionyl chloride were mixed in advance, and charged into the reactor.

Subsequently, the temperature was increased and stirred while heating at 100° C. for 4 hours. Thereafter, the mixture was cooled to 65° C., and 125 ml of methanol was added dropwise and stirred for about 30 minutes.

Further 40 ml of water was added to precipitate the product dissolved in the reaction solution. The solid content containing the precipitate and the undissolved material after the reaction was collected by suction filtration. The resulting solid was washed with 100 ml of methanol until the color of the filtrate disappeared (4 times).

The washed solid content was dried in vacuo at 105° C. for 5 hours to obtain 140 g (yield: 98%) of a powdery cellulosic resin (cellulose propionate stearate)

The obtained sample (cellulose propionate stearate) was measured by $^1$H-NMR (AV-400, manufactured by Bruker Corporation, 400 MHz, solvent: $CDCl_3$ (partial dissolution)), and as a result, $DS_{Lo}$ was 0.39 and $DS_{Sh}$ was 2.15.

In addition, this sample was measured and evaluated for nitrogen content, impact strength, flexural strength and thermal decomposition resistance according to the same method as in Example 1. The results are shown in Table 1. Furthermore, the sample was analyzed by GPC measurement in the same manner as in the example. The obtained chromatogram was shown in FIG. 1 (a)-1 (b). From FIG. 1 (a)-1 (b), it can be seen that the high molecular weight component is formed in a large amount. The content ratio of the high molecular weight component is shown in Table 1.

Comparative Example 2

A cellulose resin (cellulose propionate stearate) was produced according to the same amount and method as in Example 1, except that the temperature at the time of heating and stirring was changed to 110° C. (yield: 13.9 g, yield ratio: 90%).

The obtained sample (cellulose propionate stearate) was measured by $^1$H-NMR in the same manner as in Example 1, and as a result, $DS_{Lo}$ was 0.49 and $DS_{Sh}$ was 2.25.

In addition, this sample was measured and evaluated for nitrogen content, impact strength, flexural strength and thermal decomposition resistance according to the same method as in Example 1. The results are shown in Table 1. Furthermore, the sample was analyzed by GPC measurement in the same manner as in the example. The obtained chromatogram was shown in FIG. 1 (a)-1 (b). From FIG. 1 (a)-1 (b), it can be seen that a high molecular weight component is hardly formed. The content ratio of the high molecular weight component is shown in Table 1.

For Examples 1 to 3 and Comparative Examples 1 and 2, Table 1 shows the degree of substitution ($DS_{Lo}$) of the long-chain component (octadecanoyl group (corresponding to the acyl group portion contained in stearic acid)) and the degree of substitution ($DS_{Sh}$) of the short-chain component (propionyl group) of the produced cellulosic resin (cellulose propionate stearate), as well as the evaluation results of impact strength, flexural strength and thermal decomposition resistance, and the GPC measurement results.

TABLE 1

| | Reaction Solvent | Reaction Temperature [° C.] | $DS_{Lo}$ of long-drain component | $DS_{Sh}$ of short-drain component | Nitrogen Content [ppm] | Content Ratio of high molecular weight component [%] | Peak top molecular weight Mp [×$10^4$] | Impact Strength [kJ/$m^2$] | Flexural Strength [MPa] | $Td_{1\%}$ (TGA) [° C.] |
|---|---|---|---|---|---|---|---|---|---|---|
| Example 1 | NMP/Pyridine | 100 | 0.44 | 2.16 | 310 | 3.2 | 8.7 | 14.9 ○ | 40 ○ | 290 ○ |
| Example 2 | NMP/Pyridine | 90 | 0.41 | 2.12 | 430 | 5.0 | 8.9 | 12.7 ○ | 44 ○ | 292 ○ |
| Example 3 | NMP/Pyridine | 80 | 0.39 | 2.07 | 460 | 6.5 | 9.6 | 13.7 ○ | 49 ○ | 281 ○ |
| Comparative Example 1 | Pyridine | 100 | 0.39 | 2.15 | 3400 | 17.3 | 11.5 | 5.7 ○ | 43 ○ | 231 x |
| Comparative Example 2 | NMP/Pyridine | 110 | 0.49 | 2.25 | 260 | 1.0 | 6.2 | 3.3 x | 33 x | 291 ○ |

As shown in Table 1, it can be seen that the cellulose resins of the Examples according to the exemplary embodiment of the present invention has a nitrogen content in the range of 300 to 2000 ppm, and are excellent in mechanical properties (impact strength, flexural strength) and thermal decomposition resistance. In addition, it can be seen that the content ratio of the high molecular weight component of the cellulose resin of Examples 1 to 3 is in the range of 2 to 10%.

Furthermore, it can be seen that the cellulose resin having a nitrogen content of more than 2000 ppm (Comparative Example 1) has inferior thermal decomposition resistance. Also, it can be seen that the cellulose resin (Comparative Example 1) has a relatively large content ratio of a high molecular weight component. On the other hand, it can be seen that the cellulose resin having a nitrogen content of less than 300 ppm (Comparative Example 2) has inferior mechanical properties (impact strength, flexural strength). In addition, it can be seen that the cellulose resin (Comparative Example 2) has a relatively small content ratio of a high molecular weight component.

Having thus described the present invention with reference to the exemplary embodiments and Examples, the present invention is not limited to the above-described exemplary embodiments and Examples. Various modifications understandable to those skilled in the art may be made to the constitution and details of the present invention within the scope thereof.

Some or the whole of the above exemplary embodiments can be described also as the following exemplary embodiments, but is not limited to the following.

Further Exemplary Embodiment 1

A cellulose resin in which hydrogen atoms of hydroxy groups of cellulose are substituted with a long-chain component which is a linear aliphatic acyl group having 14 or more carbon atoms and a short-chain component which is at least one of an acyl group having 2 carbon atoms and an acyl group having 3 carbon atoms,
wherein a nitrogen content in the cellulose resin is 300 ppm or more and 2000 ppm or less.

Further Exemplary Embodiment 2

The cellulose resin according to further exemplary embodiment 1, wherein the cellulose resin has a basic nitrogen-containing group.

Further Exemplary Embodiment 3

The cellulose resin according to further exemplary embodiment 2, wherein the basic nitrogen-containing group is a pyridine ring-containing group.

Further Exemplary Embodiment 4

The cellulose resin according to any one of further exemplary embodiments 1 to 3, wherein, in a GPC chromatogram (elution curve) of the cellulose resin, measured by gel permeation chromatography (GPC), the GPC chromatogram has a sub-peak or a reading in a region having a molecular weight of 9 million or more, and a content ratio (area ratio) of a high molecular weight component corresponding to the region is in a range of 2 to 10%.

Further Exemplary Embodiment 5

The cellulosic resin according to any one of further exemplary embodiments 1 to 4, wherein a degree of substitution $DS_{Lo}$ with the long-chain component is in the range of 0.2 to 0.6, and the degree of substitution $DS_{Sh}$ with the short-chain component is in the range of 1.7 to 2.8.

Further Exemplary Embodiment 6

The cellulose resin according to further exemplary embodiment 5, wherein a sum of the degree of substitution $DS_{Lo}$ and the degree of substitution $DS_{Sh}$ is 2.1 or more.

Further Exemplary Embodiment 7

The cellulose resin according to any one of further exemplary embodiments 1 to 6, wherein the long-chain component is an acyl group portion of at least one fatty acid selected from myristic acid, palmitic acid, stearic acid, arachidic acid, and behenic acid.

Further Exemplary Embodiment 8

A molding material comprising a cellulose resin according to any one of further exemplary embodiments 1 to 7.

Further Exemplary Embodiment 9

A molded body formed using the molding material described in further exemplary embodiment 8.

Further Exemplary Embodiment 10

A method for producing a cellulose resin, the cellulose resin being according to any one of further exemplary embodiments 1 to 7, comprising:
reacting a pulp dispersed in an organic solvent with a short chain acylating agent for introducing an acyl group having 2 to 3 carbon atoms and a long-chain acylating agent for introducing an acyl group having 14 or more carbon atoms, in the presence of a basic nitrogen-containing organic compound under heating at 100° C. or below, to acylate hydroxy groups of a cellulose constituting the pulp; and
separating an acylated cellulose obtained by the acylation from the organic solvent.

(Further Exemplary Embodiment 11

The method for producing a cellulose resin according to further exemplary embodiment 10, wherein the basic nitrogen-containing organic compound is pyridine.

Further Exemplary Embodiment 12

The method for producing a cellulose resin according to further exemplary embodiment 10 or 11, wherein the organic solvent is N-methylpyrrolidone.

Further Exemplary Embodiment 13

The method for producing a cellulose resin according to any one of further exemplary embodiments 10 to 12, wherein a mixing ratio (mass ratio R/S) of the basic nitrogen-containing organic compound (R) and the organic solvent (S) is in a range of 5/95-30/70.

Further Exemplary Embodiment 14

The method for producing a cellulose resin according to any one of further exemplary embodiments 10 to 13, wherein a reaction temperature of the acylation step is in a range of 70 to 100° C.

Further Exemplary Embodiment 15

The method for producing a cellulose resin according to any one of further exemplary embodiments 10 to 14, wherein a total amount of the organic solvent and the basic nitrogen-containing organic compound is 10 to 50 times the dry mass of the pulp.

Further Exemplary Embodiment 16

The method for producing a cellulose resin according to any one of further exemplary embodiments 10 to 15, wherein the short chain reagent is at least one selected from acetyl chloride, acetic anhydride, propionic anhydride and propionyl chloride, and the long-chain reactive agent is an acid chloride of a linear fatty acid having 14 or more carbon atoms.

This application claims the right of priority based on Japanese Patent Application No. 2018-36423, filed Mar. 1, 2018, the entire content of which is incorporated herein by reference.

The invention claimed is:

1. A method for producing a cellulose resin in which hydrogen atoms of hydroxy groups of cellulose are substituted with a long-chain component which is a linear aliphatic acyl group having 14 to 48 carbon atoms and a short-chain component which is at least one of an acyl group having 2 carbon atoms and an acyl group having 3 carbon atoms, wherein a nitrogen content in the cellulose resin is 300 ppm or more and 2000 ppm or less, and wherein, in a GPC chromatogram (elution curve) of the cellulose resin, measured by gel permeation chromatography (GPC), the GPC chromatogram has a sub-peak or a reading in a region having a molecular weight of 9 million or more, and a content ratio (area ratio) of a high molecular weight component corresponding to the region is in a range of 2 to 10%, the method comprising:

reacting a pulp dispersed in an organic solvent with a short chain acylating agent for introducing an acyl group having 2 to 3 carbon atoms and a long-chain acylating agent for introducing an acyl group having 14 to 48 carbon atoms, in the presence of a basic nitrogen-containing organic compound under heating at 100° C. or below, to acylate hydroxy groups of a cellulose constituting the pulp; and separating an acylated cellulose obtained by the acylation from the organic solvent, wherein a mixing ratio (mass ratio R/S) of the basic nitrogen-containing organic compound (R) and the organic solvent (S) is in a range of 5/95 to 30/70, the basic nitrogen-containing organic compound is pyridine, the organic solvent is N-methylpyrrolidone, the short chain reagent is at least one selected from acetyl chloride, acetic anhydride, propionic anhydride and propionyl chloride, the long-chain reactive agent is an acid chloride of a linear fatty acid having 14 or more carbon atoms, and a reaction temperature of the acylation is in a range of 70 to 100° C.

2. The method for producing a cellulose resin according to claim 1, wherein a total amount of the organic solvent and the basic nitrogen-containing organic compound is 10 to 50 times the dry mass of the pulp.

3. The method for producing a cellulose resin according to claim 1, wherein a degree of substitution $DS_{Lo}$ with the long-chain component is in a range of 0.2 to 0.6, and a degree of substitution $DS_{Sh}$ with the short-chain component is in a range of 1.7 to 2.8.

4. The method for producing a cellulose resin according to claim 1, wherein the cellulose resin has a pyridine ring coordinated to the cellulose.

5. The method for producing a cellulose resin according to claim 1, wherein the nitrogen content is a content of nitrogen derived from a pyridine ring coordinated to the cellulose.

6. The method for producing a cellulose resin according to claim 1, a nitrogen content in the cellulose resin is 300 ppm or more and 1000 ppm or less.

* * * * *